(12) United States Patent
Baumgart et al.

(10) Patent No.: US 8,065,686 B2
(45) Date of Patent: Nov. 22, 2011

(54) LOGGING AND STORING OF A SEQUENCE OF IMAGE FRAME DATA FOR OPTIMAL RECOVERY AFTER POWER FAILURE

(75) Inventors: John Baumgart, Hoffman Estates, IL (US); Benita Devadas, Bartlett, IL (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 998 days.

(21) Appl. No.: 11/958,832

(22) Filed: Dec. 18, 2007

(65) Prior Publication Data

US 2008/0301384 A1 Dec. 4, 2008

Related U.S. Application Data

(60) Provisional application No. 60/940,771, filed on May 30, 2007.

(51) Int. Cl.
*G06F 9/54* (2006.01)
*G06F 11/00* (2006.01)

(52) U.S. Cl. .......................... 719/318; 714/20
(58) Field of Classification Search .................. 719/318
See application file for complete search history.

(56) References Cited

U.S. PATENT DOCUMENTS

| 8,015,443 B2* | 9/2011 | Adachi ........................... 714/20 |
| 2004/0176981 A1* | 9/2004 | Martello et al. ................. 705/2 |
| 2007/0043596 A1* | 2/2007 | Donaldson et al. ............... 705/3 |
| 2007/0269019 A1 | 11/2007 | Spahn |

* cited by examiner

*Primary Examiner* — Andy Ho
*Assistant Examiner* — Abdou Seye
(74) *Attorney, Agent, or Firm* — Alexander J Burke

(57) ABSTRACT

A method of logging and storing of a sequence of acquired X-ray image frame data in an X-ray imaging lab includes logging and updating image frame data related information in a non-volatile memory on a real-time basis upon completion of storage of each image frame data and deleting the logged information upon completion of storage of the sequence of X-ray image frames.

8 Claims, 3 Drawing Sheets

LOGGING AND STORING OF A SEQUENCE OF IMAGE FRAME DATA FOR OPTIMAL RECOVERY AFTER POWER FAILURE

CROSS-REFERENCE TO RELATED CASES

This is a U.S. non-provisional application of U.S. provisional patent application Ser. No. 60/940,771 filed on May 30, 2007, the entire disclosure of which is incorporated herein by reference.

FIELD OF THE INVENTION

This disclosure is generally related to X-ray imaging labs and methods that acquires and stores X-ray image frame data.

BACKGROUND

In many X-ray imaging labs, X-ray images are acquired and stored for later viewing. In radiographic applications (e.g. chest X-ray) a single image or frame is acquired and stored. In other applications, however, multiple frames of X-ray images are acquired and stored. The particular number of frames of images acquired and stored depends on the application. For example, in fluoroscopic imaging applications the images are acquired at 10 frames per second (fps). In other applications the X-ray images can be acquired at 30 fps or up to 60 fps and stored.

In those applications where many frames of X-ray images are acquired and stored in a scene, however, if the X-ray imaging lab encounters an unplanned power loss the X-ray image acquisition and storing is interrupted and the X-ray image data acquired at the time of the power interruption can be lost when the power is restored to the system.

In order to prevent or minimize the loss of the image data in an unexpected power loss situation, some existing X-ray imaging lab log the description and the location of the image frame data being stored during an X-ray scene acquisition. (A scene is defined as a consecutive sequence of images which is acquired while an operator operates the X-ray release switch without interruption, for example, a footswitch or a hand switch.) The X-ray imaging lab's real-time program module performing the real-time storage of the X-ray image data notifies a non-real-time program module of a frame data being stored to the X-ray imaging lab's data storage unit (e.g. data storage disk). The non-real-time program module would then log the description and the location of the image frame data in a non-volatile data storage location so that upon power-up from an unplanned power loss, the logged information can be retrieved.

In the conventional X-ray imaging lab, however, there is a time lag between the real-time program module writing the image frame data and the non-real-time program module logging the log data. This latency means that some image frame data can be stored but not yet logged when an unexpected power interruption occurs during acquisition of a sequence of X-ray image frames.

SUMMARY

According to an embodiment, a method of logging and recovery of acquired image frame data (e.g. a sequence of X-ray image frames) after a power failure is disclosed. The method comprises the system's non-real-time program module storing an initial frame description and a header file into a frame description database in the system's data storage unit. Header file contains frame acquisition parameters and the name of the data file where the image frames will be written. Then, the system's real-time program module acquires and stores the image frame data during which the real-time program module logs the number of image frames acquired and the name of the data file, into which the image frames are being stored, to a log file in real time as each image frame is stored. The log file is stored into a data storage unit and the logging is accomplished through an unbuffered I/O of the data storage unit.

Upon completion of storing each image frame, the real-time program module updates the log file with the cumulative number of image frames stored up to that point. Preferably, the updating of the log file is accomplished by an unbuffered I/O for the data storage unit in which the data file is located. Upon completion of acquisition and storing of the intended number of image frames, the non-real-time program module deletes the log file and the header file. Thus, the presence of the log file upon a power-up of the system indicates that the system is powering up from a power interruption that happened in the middle of a data acquisition and recording session.

BRIEF DESCRIPTION OF THE DRAWINGS

All drawings are schematic illustrations and the structures rendered therein are not intended to be in scale. The embodiments of this disclosure are described below with reference to the above drawings in which like reference numerals designate like elements.

DETAILED DESCRIPTION

As used herein, the terms "storing" or "writing" is used interchangeably to refer to the process of storing data on to a data storage medium such as a computer hard disk, RAM, etc.

Figure 1:
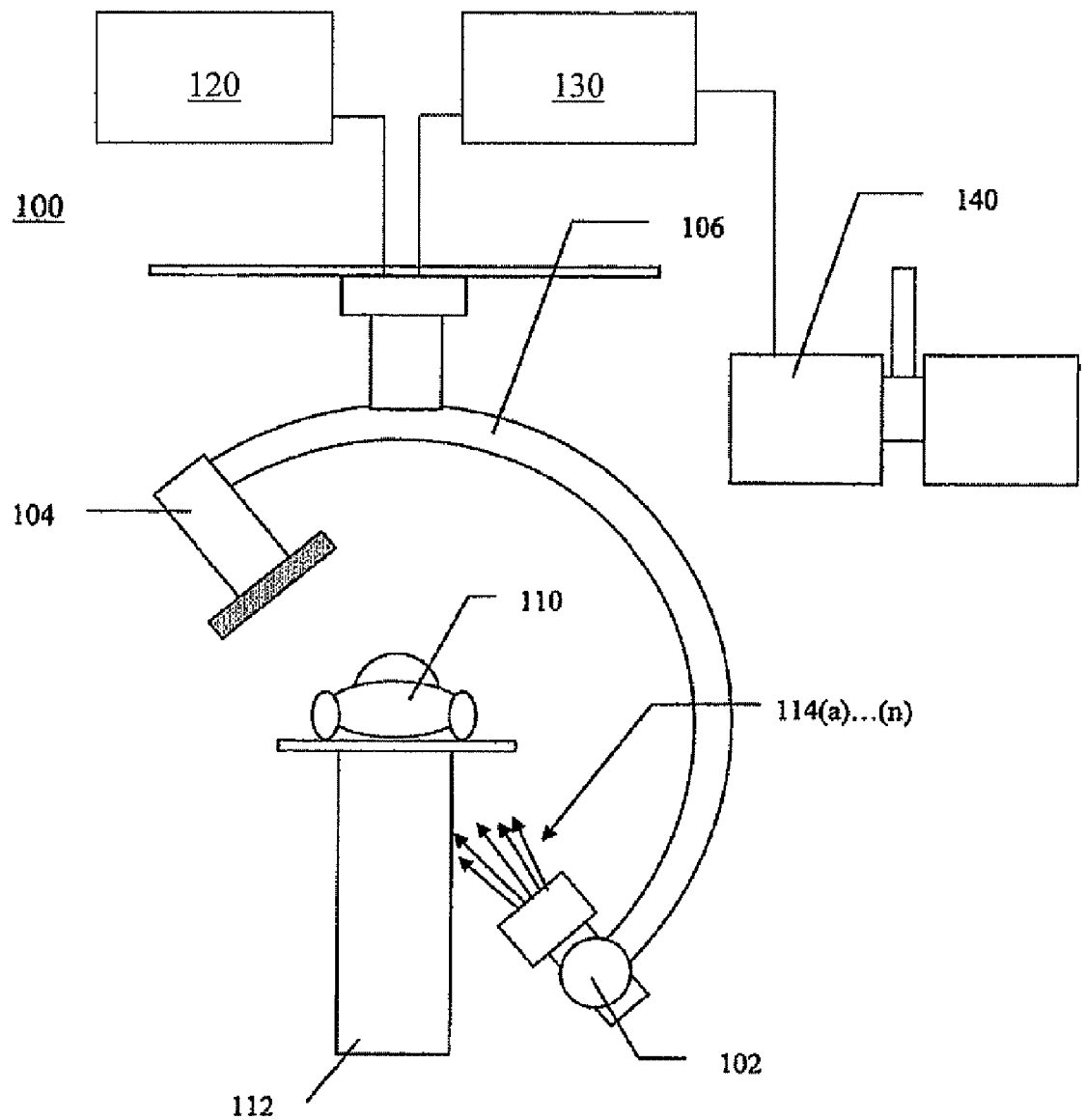
FIG. 1 is an illustration of an X-ray imaging lab in which an embodiment of the method disclosed herein can be implemented.

FIG. 1 shows an example of an imaging lab 100 in which the method of this disclosure can be implemented. The imaging lab 100 is an X-ray imaging lab. A patient 110 is placed on a table 112. A support member, such as a C-arm, 106 supports an X-ray emitting unit, such as an X-ray tube 102 and an X-ray detecting unit 104. The X-ray emitting unit 102 is adapted to emit X-rays 114($a$) . . . ($n$) and the X-ray detecting unit 104 is adapted to absorb and measure the emitted X-rays. An X-ray generator unit 120 generates the X-rays emitted by the X-ray emitting unit 102. The X-ray generator 120 is typically, for example, an X-ray producing device that includes a source of electrons, a vacuum within which the electrons are accelerated, and an energy source that causes the electrons to be accelerated. X-ray images of all or parts of the patient 110 may be formed from the output of the X-ray detecting unit 104.

A system control unit 130 controls the operation of the X-ray imaging lab 100. The system control unit 130 controls the X-ray generator 120. The system control unit 130 also performs acquisition, processing and storage of the X-ray image frame data as well as transmission of the image data for display on the image display unit 140 for viewing by the operator. The X-ray signals captured by the X-ray detecting unit 104 are received into the system control unit 130 over a high-speed data link between the X-ray detector 104 and the system control unit 130. The captured X-ray signals are usually preprocessed into a useable data format at the X-ray detector 104 and received at the system control unit's data buffer (not shown). The system control unit 130 then accesses the image frame data received into the buffer and store the data to a non-volatile data storage unit 136, appropriately process the data and display the images on the display unit 140.

Figure 2:
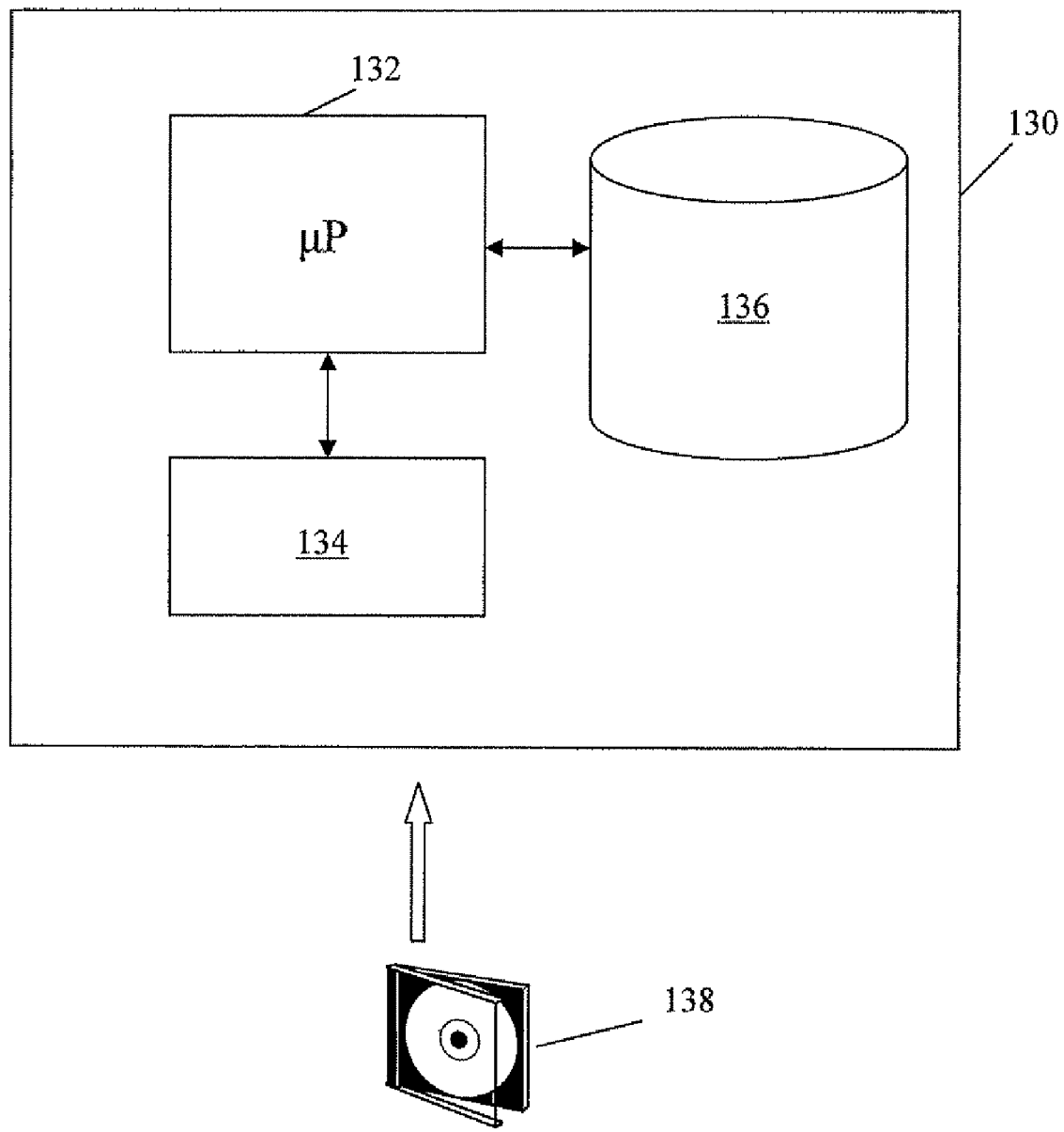
FIG. 2 is a schematic block diagram of a system control unit for the X-ray imaging lab of FIG. 1.

Referring to FIG. 2, the system control unit 130 comprises a central processing unit 132, a system memory unit 134 and at least one non-volatile data storage unit 136. The system memory unit 134 can be read only memory (ROM) unit and contains the operating system program for the X-ray imaging lab 100 which the system control unit 130 accesses. A program embodying a set of instructions for carrying out the method of this disclosure can be provided as a firmware stored in the system memory unit 134. In another embodiment, the program embodying a set of instructions for carrying out the method of this disclosure can be provided as software on a portable computer readable storage media 138, such as a compact disc, flash memory cards, etc. The non-volatile data storage unit 136 can be a hard disk drive unit found in many computers or a RAM unit with sufficiently large storage capacity to handle storage of the amount of image frame data typically processed by the X-ray imaging lab 100.

The system control unit 130 also comprises two program modules. The first program module is a real-time system module that controls the imaging system's functions associated with generation and detection of X-rays and acquisition of the X-ray image frames. The second program module is a non-real-time system module that controls all other system functions such as the user-interface and the database management, etc. These two program modules can be provided as components of the operating system program for the X-ray imaging lab 100.

Figure 3:
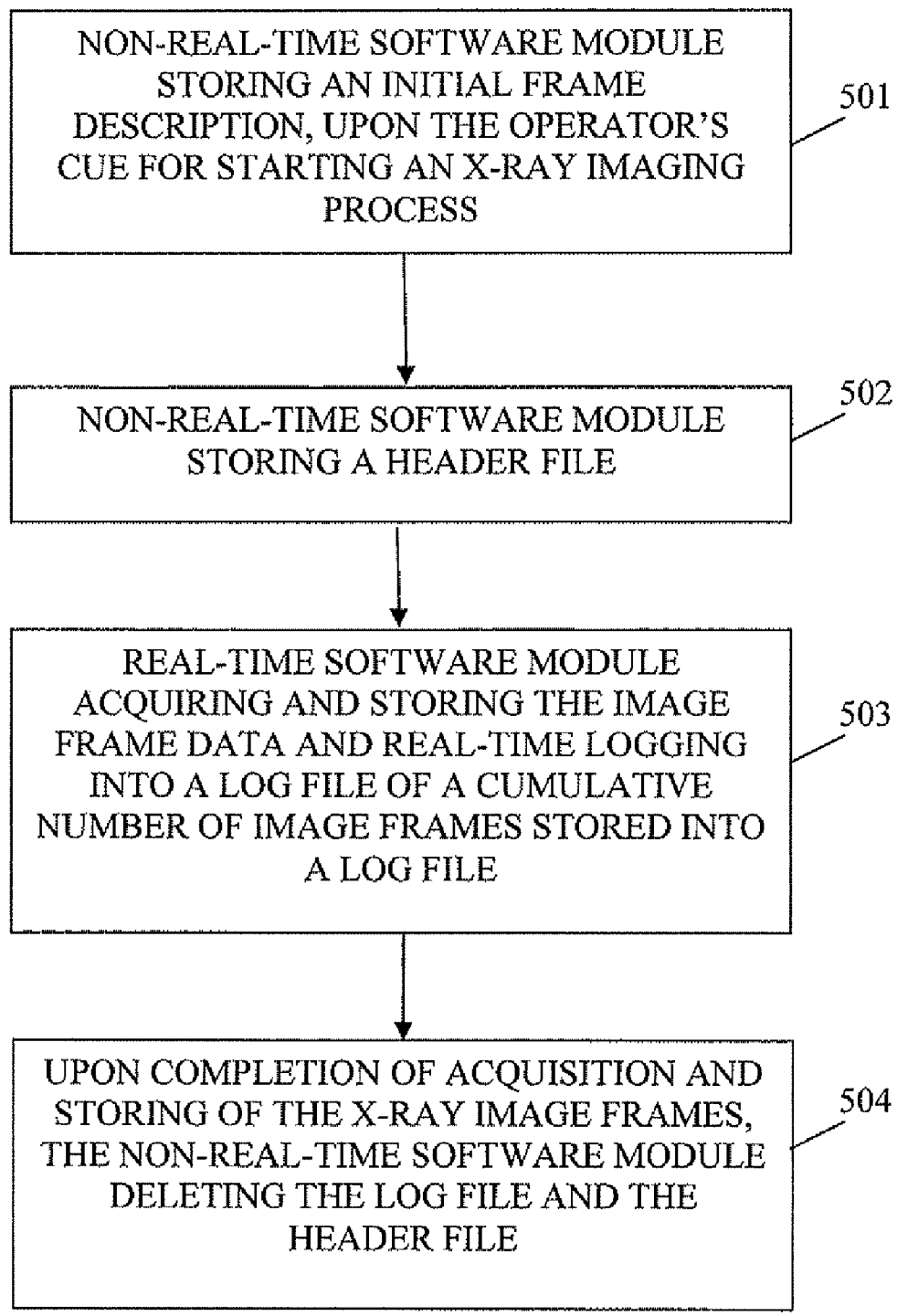
FIG. 3 is a flow chart of an embodiment of the method disclosed herein.

FIG. 3 shows a flow chart 500 illustrating the method of storing acquired image frame data (e.g. a sequence of X-ray image frames) in an X-ray imaging lab according to an embodiment of the disclosure. In a typical X-ray imaging lab, the operator inputs the patient identification information such as the patient's name into the system control unit 130 and also sets the various parameters and setting for the particular X-ray imaging session. The X-ray parameters can be information about the X-ray mode and the intended image processing parameters that will be required to retrieve and view the stored X-ray image frame data. Possible parameters relevant to accurate display of the X-ray images include, but are not limited to the image matrix size, the expected rate of the acquisition, whether the image is to be displayed subtracted or not, the relationship between the image pixel values and the X-ray beam intensity, the window/leveling to be applied, edge enhancement parameters to be applied, etc. After the patient's X-ray imaging session related information is inputted into the X-ray imaging lab 100 and the patient 110 is in position, the operator can begin the X-ray imaging process. This is done by the operator via a switch and in most X-ray imaging labs, a foot switch or a hand switch is provided.

Upon the operator's cue for starting the X-ray imaging process, in this example the operator pressing a footswitch, before the X-ray image acquisition actually begins, the non-real-time program module component of the system control unit 130 stores or writes an initial frame description into a frame description database stored on the system's data storage unit 136 (see box 501 of the flow chart).

The initial frame description contains such information as the patient information, intended processing parameters for the image, the X-ray mode used, etc. The intended processing parameter refers to the information about how the frames should be viewed. For example, the X-ray systems usually has various settings in terms of number of frames captured per second depending on whether the images are to be viewed as video sequence or still slides. To be viewed as a video sequence, for example, the X-ray images are usually acquired at a frame acquisition rate of 10 to 30 fps depending on the needs of the particular application. For still image viewing purposes, the frame acquisition rate can be lower. Such information stored in the initial frame description allows the stored X-ray image frame data to be subsequently retrieved and viewed properly according to the intended purpose. According to an embodiment, the frame description database preferably contains a number of initial frame descriptions, one for each set of X-ray image frames saved. Each initial frame description entry in the frame description database would be tagged with an identifier that cross-references to the image file containing the corresponding X-ray image frames. Having the initial frame description written before the X-ray image frame acquisition prevents the initial frame description information from being corrupted by a power loss that may happen during the X-ray image frame acquisition process.

The non-real-time program module component also stores or writes a header file on the system's data storage unit 136 (see box 502 of the flow chart). The header file contains frame acquisition parameters and the name of the X-ray image data file where the image frame data will be written. The frame acquisition parameter refers to the total number of frames intended to be acquired and stored in the particular X-ray imaging session and that information is predefined by the operator. The operator can input the information into the X-ray imaging lab via an appropriate user interface device such as a key board. In another embodiment, the user interface software for the operating system can provide a choice of predefined selections for X-ray frame acquisition parameters for the operator to choose from. The X-ray imaging lab's system control unit 130 stops the X-ray image frame acquisition process after the predefined number of frames have been acquired and stored, even when the operator continues to press down the foot switch.

Then, the system's real-time program module begins acquiring and storing the X-ray image frame data on to the data storage unit 136 during which the real-time program module also logs into a log file, in real-time, the cumulative number of image frames stored and the name of the X-ray image data file (see box 503 of the flow chart). The real-time logging of the information is written to a log file upon completion of acquisition and safe storage of an image frame into the data storage unit 136. Thus, the log file is updated with new information on the cumulative number of image frames stored each time a frame is safely stored. If the data input/output (I/O) traffic to the data storage unit 136 can be buffered or unbuffered, the updating of the log file is accomplished by an unbuffered I/O to prevent any native latency introduced by a buffered I/O strategy of the underlying operating system when writing to the data storage unit 136. Especially in systems where the data storage unit 136 is a hard disk, a buffered disk I/O can introduce unwanted latency in the logging of the number of image frames stored into the log file.

Upon completion of acquisition and storing of the intended number of image frames, the non-real-time program module deletes the log file and the header file (see box 504 of the flow chart). Upon completion of the acquisition and storing of all image frames, the real-time storage system knows that the image frame data has been safely stored into the X-ray image data file on the data storage unit 136 by the normal I/O handshakes that occur between the central processor unit 132 and the data storage unit 136.

At this point, if another X-ray image frame data is to be acquired and stored, the operator can make appropriate updates to the X-ray imaging system settings and start the process illustrated in the flow chart 500 again. Optionally, upon completion of the image frame acquisition and the acquired X-ray image frames are safely stored, the non-real-time program module can also update the initial frame description entry with the closing information. The closing information at least comprises the actual number of frames that were stored.

According to an embodiment of the disclosure, because the method writes a log file during the image frame acquisition and storage process and then deletes it upon completion of the image frame acquisition and storage, if there were a power failure to the X-ray imaging lab 100 during an X-ray imaging session, the log file will be present when the system powers back up. Thus, according to an embodiment of the present disclosure, the system control unit 130 configured such that the non-real-time program module checks for the presence of a log file on the data storage unit 136, upon each power-up of the system control unit 130. The presence of a log file is an indication that the X-ray imaging lab 100 is powering up from a power failure that interrupted an X-ray imaging session. If a log file is detected, the non-real-time program module retrieves the information saved in the log file, the header file and the X-ray image data file and recover the image frames.

The log file contains the information on the number of complete image frames that were safely stored. Using this information to retrieve the image frame data is important because generally where the data storage unit 136 is a hard disk drive, the data sectors associated with the X-ray image data file can contain old X-ray image frame data unrelated to the present data. Thus, in situations where the data writing is interrupted as in a power interruption scenario, only the image frames that were freshly stored at the time of the power interruption should be retrieved. For example, if twenty image frames were intended to be stored and the power interruption occurred while tenth frame was being written onto the disk, blindly retrieving twenty frames worth of the image frame data from the X-ray image data file would retrieve whatever data that may exist in that sector past the nine good image frames. The additional data could be previously written X-ray image frame data of some other patient. Thus, these superfluous image frame data can corrupt the retrieved data. However, according to the method of this disclosure, the non-real-time program module will know from the information in the log file that only nine image frames were completely stored at the time of the power failure and only retrieve nine image frame data for recovery.

According to an aspect of the present disclosure, the method described herein can be implemented on an X-ray imaging lab by a computer readable program storage device, tangibly embodying a program of instructions executable by the computer to perform the method disclosed herein.

The present disclosure discussed only one data storage unit 136 in which the initial frame data, the header file, the log file, and the X-ray image frame data are stored. However, the various data and files need not be stored in one physical data storage unit such as the unit 136. If appropriate, one or more data storage devices can be provided in addition to the data storage unit 136 that are accessible to the system control unit 130 for storing the various data files.

Based on the features of the embodiments of the method disclosed herein, further variations will now become apparent to persons skilled in the art. All such variations are considered to be within the scope of the appended claims.

What is claimed is:

1. A method of logging and storing of a sequence of X-ray image frame data acquired by an X-ray imaging system, said method comprising:
   storing intended processing parameters for the X-ray image frame data before acquiring and storing the sequence of X-ray image frame data;
   acquiring and storing the sequence of X-ray image frame data;
   recording log data into a log file, in real time, said log data indicating a cumulative number of image frames stored, the recording being performed upon completion of storing each individual image frame of a sequence of X-ray image frames; and
   upon completion of the acquiring and storing of the sequence of X-ray image frame data, deleting the log file, wherein the presence of the log file upon a power-up of the X-ray imaging tab system indicates that the X-ray imaging system is powering up from a system failure that happened during an X-ray image frame data acquisition and storing session.

2. The method of claim 1, wherein said recording into the log file is accomplished by an unbuffered input/output (I/O) for a data storage unit.

3. The method of claim 1, further comprising: storing patient information data before acquiring and storing the sequence of X-ray image frame data.

4. The method of claim 3, further comprising storing a header file, wherein the header file comprises frame acquisition parameters and the name of an image frame data file into which the X-ray image frame data is stored.

5. The method of claim 1, further comprising recovering the stored X-ray image frame data from the image frame data file if the log file is present upon power-up of the X-ray imaging system.

6. The method of claim 1, further comprising updating the initial frame description with closing information upon completion of the acquiring and storing of the sequence of X-ray image frame data, wherein the closing information comprising a total number of X-ray image frames.

7. A computer readable program storage device, tangibly embodying a program of instructions executable by the computer to perform a method of logging and storing of a sequence of X-ray image frame data acquired by an X-ray imaging system, wherein the X-ray imaging system includes a control unit having a real-time program module and a non-real-time program module and wherein said method comprising:
   storing intended processing parameters for the X-ray image frame data before acquiring and storing the sequence of X-ray image frame data;
   the real-time program module acquiring and storing the sequence of X-ray image frame data;
   recording log data into a log file, in real time, said log data indicating a cumulative number of image frames stored, the recording being performed upon completion of storing each individual image frame of a sequence of X-ray image frames; and
   upon completion of the acquiring and storing of the sequence of X-ray image frame data, deleting the log file, wherein the presence of the log file upon a power-up of the system indicates that the system is powering up from a system failure that happened during an X-ray image frame data acquisition and storing session.

8. An X-ray imaging system including a processor for logging and storing a sequence of X-ray image frames, the X-ray imaging system comprising:
- a non-real-time program module storing intended processing parameters for an X-ray image frame data before acquiring and storing a sequence of X-ray image frame data;
- a real-time program module acquiring and storing the sequence of X-ray image frame data;
- the real-time program module recording log data into a log file, said log data indicating a cumulative number of image frames stored, the recording being performed upon completion of storing each individual image frame of a sequence of X-ray image frames; and
- upon completion of the acquiring and storing of the sequence of X-ray image frame data, deleting the log file, wherein the presence of the log file upon a power-up of the X-ray imaging system indicates that the X-ray imaging system is powering up from a system failure that happened during an X-ray image frame data acquisition and storing session.

\* \* \* \* \*